Sept. 19, 1933.  A. A. THOMAS  1,927,141
ELECTROMAGNETIC TRANSLATING DEVICE
Filed Nov. 15, 1927
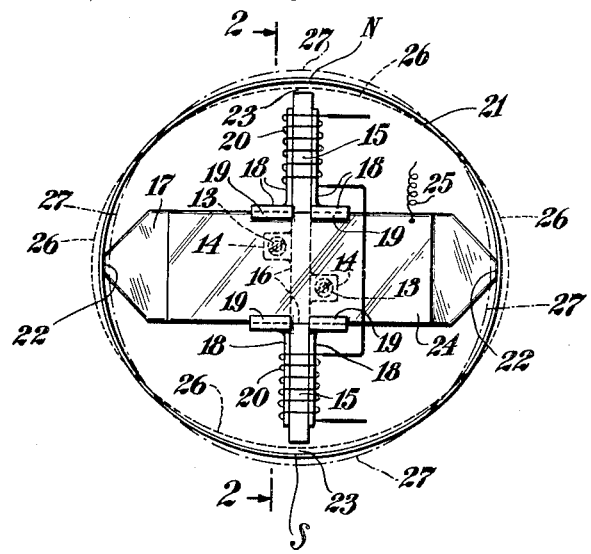
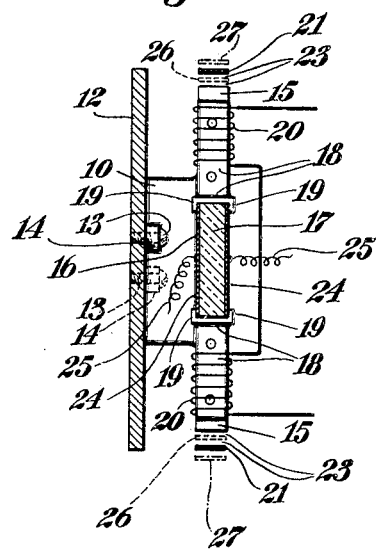
INVENTOR
Adolph A. Thomas Patented Sept. 19, 1933

1,927,141

UNITED STATES PATENT OFFICE 1,927,141

ELECTROMAGNETIC TRANSLATING DEVICE

Adolph A. Thomas, New York, N. Y.

Application November 15, 1927
Serial No. 233,335

9 Claims. (Cl. 179—171)

My invention is for a novel electromagnetic device in which an elastic magnetic ring is operated by a piezo-electric crystal or similar element to produce electric impulses in accordance with the movements of the crystal or element. The elastic ring is mounted on a piezo-electric crystal at diametrically opposite points. The axial movements of the crystal (for example, the expansion and contraction thereof under variable electric pressure) deform the magnetic ring in its own plane and thereby generate current impulses in a coil or coils operatively associated with the ring. The current impulses thus produced are electrical representations of the movements of the crystal and may be utilized for any practical purpose. If the crystal is connected in a telephone or signal circuit, the output currents produced by the vibratory magnetic ring may operate a loudspeaker, a recording tool, or any other useful instrumentality.

For the purpose of explaining my invention so that those who are skilled in the art may understand and practise the same, I shall refer to the accompanying drawing, which shows a preferred embodiment of my invention.

In the drawing—

Fig. 1 represents in face view an instrument constructed in accordance with my invention, and Fig. 2 is a section on line 2—2 of Fig. 1.

Before proceeding with a detailed description of the drawing, I want to explain that it is mainly diagrammatic, and the relative dimensions of the parts have been greatly exaggerated for clearness. The actual instrument is considerably smaller and more compact than the figures in the drawing.

A magnet 10 is rigidly mounted on a suitable support 12, which I have conveniently shown in Fig. 2 as an upright strip or panel. Any practical means may be employed to support the magnet. In the present instance, bolts 13 pass through lugs 14 of magnet 10 into the support 12 for mounting the magnet securely in position. A pair of pole pieces 15 extend in opposite directions from the central body portion of the magnet and are laterally offset to provide a recess 16 adapted to receive a piezo-electric crystal 17. To provide increased supporting surface for the crystal, I may attach L-shaped brackets 18 to the pole pieces 15. The brackets 18, which may be magnetic or non-magnetic, have flanges 19 that grip the crystal like a vise and hold it firmly in position without the need of separate fastening devices. The latter, however, may be used, if desired, such as small pins or cement to prevent accidental displacement of the crystal lengthwise.

A coil 20 surrounds one or both magnetic pole pieces 15. If two coils are used, they are preferably connected in series. It is understood that the coil or coils 20 are properly connected in circuit to utilize the electric impulses generated during the operation of the instrument, as will later be explained. It is not considered necessary to show any circuit connections, since they are well understood and do not in and of themselves form part of this invention.

An elastic magnetic ring 21 is mounted on, or securely connected to, the opposite ends 22 of the piezo-electric crystal 17, so that the ring is supported at diametrically opposite points for deformational movements in its own plane. When I describe the supporting points 22 as diametrically opposite, I mean it in a practical sense with due allowance for variations, and not in a strictly mathematical definition. It is preferable to have the normal diameter of ring 21 slightly smaller than the normal distance between the opposite points 22 of crystal 17, so that the ring is always in pressure contact with the crystal ends. This initial tension of the ring not only makes it easier to connect it firmly to the crystal, but also causes the tensioned ring to respond more readily to the vibrations of the crystal. It will be seen from Fig. 1 that the supporting points 22 of the elastic ring 21 are along a diameter substantially at right angles to the diametrically aligned pole pieces 15, which terminate closely adjacent to the ring to provide a pair of airgaps 23. The elastic ring 21 is mounted on the crystal ends either by virtue of its own inherent tension, provided the latter is sufficient to maintain firm frictional contact between ring and crystal, or the ring may be cemented to the crystal ends, or other practical means may be used to hold the ring securely on the crystal. These mechanical details are obvious and require no illustration.

The opposite sides of crystal 17 are provided with thin plates 24 of good conducting metal adapted to be connected to opposite sides of a circuit by conductors 25. The plates 24 may simply be metal foil held in intimate contact with the crystal. Any other practical means may be used for properly connecting the crystal 17 in a circuit of variable potential.

The operation of the instrument is this: Variations of difference of potential impressed on opposite sides of the piezo-electric crystal 17 produce axial movements of the crystal, so that the ends 22 thereof vibrate in opposite directions. These vibratory movements of the crystal are in accordance with the frequency and magnitude of the impressed potential variations, as will be understood by those familiar with piezo-electric phenomena. When the crystal expands, the ends 22 deform the elastic ring 21 into a shape roughly indicated in an exaggerated way by the dotted line 26. In other words, the ring is contracted along a diameter coincident with the pole pieces 15, and the airgaps 23 are decreased. When the crystal 17 contracts, the tensioned ring 21 automatically moves in at points 22 and assumes the position indicated by the dash-dot line 27, so that the magnetic airgaps 23 are increased. The initial tension of ring 21 is preferably of such degree that the ring automatically follows the inward movements of the connected crystal ends 22 when the crystal contracts. This condition, however, is not absolutely necessary, and the ring may be so mounted that the contracting crystal positively pulls the ring in at the connected points, just as the expanding crystal pushes the ring out along the same diameter.

If we assume that the lines 26 and 27 represent the extreme positions of the vibratory elastic ring 21 under the action of crystal 17, there will be an infinite number of movements between those two extreme positions in response to variable electric potentials impressed on the crystal. The variations in airgaps 23 caused by the deformational movements of the elastic ring 21 produce corresponding current impulses in the coil or coils 20, and these impulses may be utilized to operate any practical mechanism, such as a loudspeaker, a recording tool for phonograph records, photographic means for controlling light, and so on.

It goes without saying that the movements of the elastic magnetic ring 21 are indicated in the drawing on a grossly exaggerated scale. In actual operation the movements of crystal 17 and ring 21 may be so small as to be undetectable with the naked eye. The crystal 17 has been shown in a conventional way as a complete crystal, but I want it clearly understood that, when I mention a piezo-electric crystal or element in the description and claims, I include any section or part of a crystal that will perform its intended operation. For instance, a plate, rod, bar, or slab may be cut from a crystal and used in constructing my invention. The dimensions of such a crystal section will depend upon the kind and size of crystal used. Crystals of quartz and Rochelle salt are among those used most commonly in instruments of the piezo-electric type. The direction of the most effective mechanical and electrical strain in the crystal or crystal section vary with different kinds of crystal, so that the best way of mounting the member 17 is often a matter of experimentation that can be readily carried out by those skilled in the art. Also, when I speak of the elastic magnetic ring 21 being in contact with opposite ends of crystal 17, I mean any two contact faces or points between which physical movements of the crystal will take place. In the broader view of my invention, the vibrations of the crystal may be produced not only electrically but also by mechanical means. The member 17 need not in all cases be supported at the center, for it may be rigidly secured at one end to a suitable support, that point of attachment also serving as a supporting point for the ring 21.

The elastic magnetic ring 21 may operate either as an armature or as a permanent magnet. If the magnetic member 10 furnishes the normal field flux, either as a permanent magnet or as an electromagnet, then the ring 21 will operate as an elastic armature for the pole pieces 15. If the ring 21 is constructed as a permanent magnet, its poles N and S should be on a diameter at right angles to the supporting points 22, so that the armature extensions 15 would be adjacent the magnet poles. The operation of the instrument is substantially the same whether the part 10 is a permanent magnet and the ring 21 a vibratory armature, as assumed in the preceding description, or whether the elastic ring 21 is a permanent magnet and the member 10 a stationary armature. In the latter event, the member 10 should be made of metal having a high magnetic permeability. If the member 10 is a permanent steel magnet, the pole pieces 15 are preferably of a material having a greater permeability than the steel body of the magnet. The magnetic member 10 and coil 20 represent any practical electromagnetic means for converting the movements of elastic ring 21 to electric impulses.

It will be clear from the foregoing description that I have provided an instrument exceedingly sensitive for indicating minute changes or movements in member 17. There is absolutely no lost motion between the parts 17 and 21, so that the latter responds to the slightest movements of the former. From a mechanical standpoint, the instrument of my invention comprises few parts, which are easy to make and assemble, and are readily adjusted into proper working relation.

Although I have shown and described a specific construction, I want it understood that my invention is not limited to the embodiment herein set forth by way of example. The fundamental principle of my invention may be carried out in practice in various other ways without departing from the scope of the invention as defined in the following claims.

I claim as my invention:

1. In an electromagnetic device, a piezo-electric crystal carrying an elastic magnetic ring which is held under tension between the ends of said crystal.

2. The combination of a vibratory member, an elastic magnetic ring supported by said member, said ring being deformable in its own plane by the vibrations of said member, and means for converting the vibrations of said ring to electric impulses.

3. An electromagnetic translating device comprising a fixed magnetic member, a piezo-electric crystal supported by said member, and a vibratory magnetic element carried by said crystal and in operative relation to said member.

4. The combination of a member adapted to expand and contract, an elastic magnetic ring engaging the ends of said member on a substantially diametric line, and electromagnetic means controlled by said ring, the expansion and contraction of said member causing deformational movement of said ring in its own plane to generate electric currents.

5. An electromagnetic transmitter comprising a fixed magnetic member having a coil, a piezo-electric crystal mounted on said member, and a vibratory magnetic element in operative relation to said member and arranged to be actuated by the movements of said crystal to generate electric impulses in said coil.

6. The combination of an elastic magnetic ring adapted to vibrate, piezo-electric means engaging said ring on a substantially diametric line to vibrate the same or to be vibrated thereby, and electromagnetic means adapted to be acted upon by said ring at a point or points approximately at right angles to said diametric line.

7. The combination of a piezo-electric crystal, an elastic magnetic ring engaging the ends of said crystal, and electromagnetic means operatively associated with said ring, said means including a fixed member which supports said crystal between its ends.

8. In an electromagnetic device, a fixed magnetic member having a recess, a piezo-electric crystal supported transversely of said member in said recess, and a vibratory magnetic member constructed and arranged to be actuated by the movements of said crystal, said members being in electromagnetic relation.

9. An electromagnetic device comprising a base, a magnetic member fixed on said base, said member having a pair of polar ends and a central recessed portion which is laterally off-set, a coil on at least one of said polar ends, a piezo-electric crystal supported between its ends in said recess transversely of said member, and an elastic magnetic ring supported by said crystal in operative relation to said fixed member, the ends of said crystal engaging said ring on a substantially diametric line which is approximately at right angles to said fixed member.

ADOLPH A. THOMAS.